United States Patent
Brisebois

(10) Patent No.: US 9,572,070 B2
(45) Date of Patent: *Feb. 14, 2017

(54) FACILITATION OF IDLE MODE TRAFFIC LOAD BALANCING

(71) Applicant: AT&T Mobility II LLC, Atlanta, GA (US)

(72) Inventor: Arthur Richard Brisebois, Cumming, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/568,539

(22) Filed: Dec. 12, 2014

(65) Prior Publication Data
US 2015/0099529 A1    Apr. 9, 2015

Related U.S. Application Data

(63) Continuation of application No. 13/596,549, filed on Aug. 28, 2012, now Pat. No. 8,942,710.

(51) Int. Cl.
*H04W 28/08* (2009.01)
*H04W 16/08* (2009.01)
*H04W 48/20* (2009.01)

(52) U.S. Cl.
CPC ............. *H04W 28/08* (2013.01); *H04W 16/08* (2013.01); *H04W 48/20* (2013.01)

(58) Field of Classification Search
CPC ...... H04W 36/04; H04W 16/32; H04W 36/30; H04W 28/08; H04W 36/22; H04W 36/32; H04W 24/02; H04W 36/0061; H04W 36/0072; H04W 36/0077; H04W 36/0083; H04W 36/38; H04W 48/20; H04W 4/06; H04W 72/005; H04W 76/02; H04W 88/12
See application file for complete search history.

(56) References Cited

U.S. PATENT DOCUMENTS 5,513,380 A * 4/1996 Ivanov ................... H04W 36/04
                                                         455/441
6,208,863 B1 * 3/2001 Salonaho ............. H04W 36/04
                                                         342/109

(Continued)

OTHER PUBLICATIONS

Office Action dated Jul. 29, 2014 for U.S. Appl. No. 13/596,549, 21 Pages.

(Continued)

*Primary Examiner* — Liton Miah
(74) *Attorney, Agent, or Firm* — Amin, Turocy & Watson, LLP

(57) ABSTRACT

A potential traffic load imbalance condition associated with sector carriers is detected. The traffic loading for the sector carriers is balanced based, at least, on causing one or more idle mobile devices to select a new sector carrier by adjusting one or more idle mode parameters. Detecting the potential traffic load imbalance condition includes: identifying an overloaded sector carrier; identifying a set of overlaid sector carriers, wherein the set of overlaid sector carriers includes one or more sector carriers in an area surrounding the overloaded sector carrier; and determining a number of idle mobile devices and corresponding signal strengths of mobile devices camping on sector carriers of the set of overlaid sector carriers. Balancing the traffic loading includes: determining the number of mobile devices to shift from the overloaded sector carrier, and initiating the shift by adjusting idle mode parameters.

20 Claims, 12 Drawing Sheets

(56) References Cited

U.S. PATENT DOCUMENTS

| | | | |
|---|---|---|---|
| 6,519,455 B1 | 2/2003 | McCormick et al. | |
| 7,308,270 B2 | 12/2007 | Lastinger et al. | |
| 7,346,352 B2 | 3/2008 | Colban et al. | |
| 7,519,027 B2 | 4/2009 | Wang et al. | |
| 7,532,887 B2 | 5/2009 | Kyung et al. | |
| 8,498,207 B2 | 7/2013 | Trigui et al. | |
| 8,619,654 B2 | 12/2013 | Yang et al. | |
| 8,620,322 B2* | 12/2013 | Park | H04W 36/30 455/436 |
| 9,077,655 B2* | 7/2015 | Babiarz | H04L 43/0876 |
| 2002/0077152 A1 | 6/2002 | Johnson et al. | |
| 2003/0073444 A1 | 4/2003 | Kogiantis et al. | |
| 2003/0223429 A1 | 12/2003 | Bi et al. | |
| 2005/0053046 A1 | 3/2005 | Wang | |
| 2005/0176419 A1 | 8/2005 | Triolo et al. | |
| 2006/0128394 A1 | 6/2006 | Turina et al. | |
| 2006/0233138 A1 | 10/2006 | Park | |
| 2007/0066234 A1 | 3/2007 | Lastinger et al. | |
| 2007/0129071 A1 | 6/2007 | Shapira | |
| 2009/0156190 A1 | 6/2009 | Fisher | |
| 2010/0081439 A1 | 4/2010 | Sie et al. | |
| 2011/0250891 A1* | 10/2011 | Zou | H04W 36/04 455/437 |
| 2012/0176901 A1 | 7/2012 | Fang et al. | |
| 2012/0197962 A1 | 8/2012 | Maenpaa et al. | |
| 2013/0064087 A1 | 3/2013 | Budic et al. | |

OTHER PUBLICATIONS

Office Action dated Feb. 25, 2014 for U.S. Appl. No. 13/596,549, 23 Pages.

Notice of Allowance dated Sep. 25, 2014 for U.S. Appl. No. 13/596,549, 20 Pages.

* cited by examiner

FACILITATION OF IDLE MODE TRAFFIC LOAD BALANCING

RELATED APPLICATION

This patent application is a continuation of, and claims priority to, U.S. patent application Ser. No. 13/596,549, filed Aug. 28, 2012, and entitled "FACILITATION OF idle mode traffic load balancing," the entirety of which application is hereby incorporated herein by reference.

TECHNICAL FIELD

The subject disclosure relates to wireless communications and, more particularly, to various embodiments that facilitate idle mode traffic load balancing.

BACKGROUND

The computational resources expended to perform processing for traffic load balancing can be extensive. Further, performing such processing can be time-consuming and ineffective.

DETAILED DESCRIPTION

Figure 1:
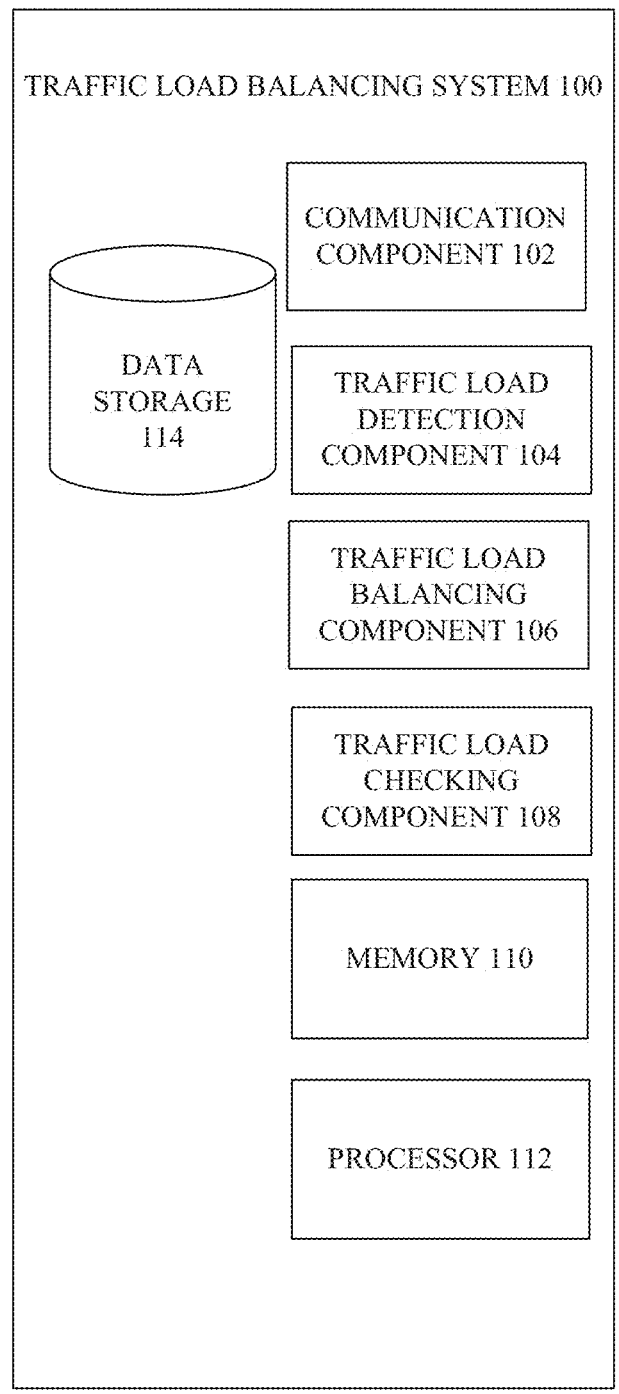
FIG. 1 illustrates an example system that facilitates processing for TL balancing in accordance with embodiments described herein.
Figure 2:
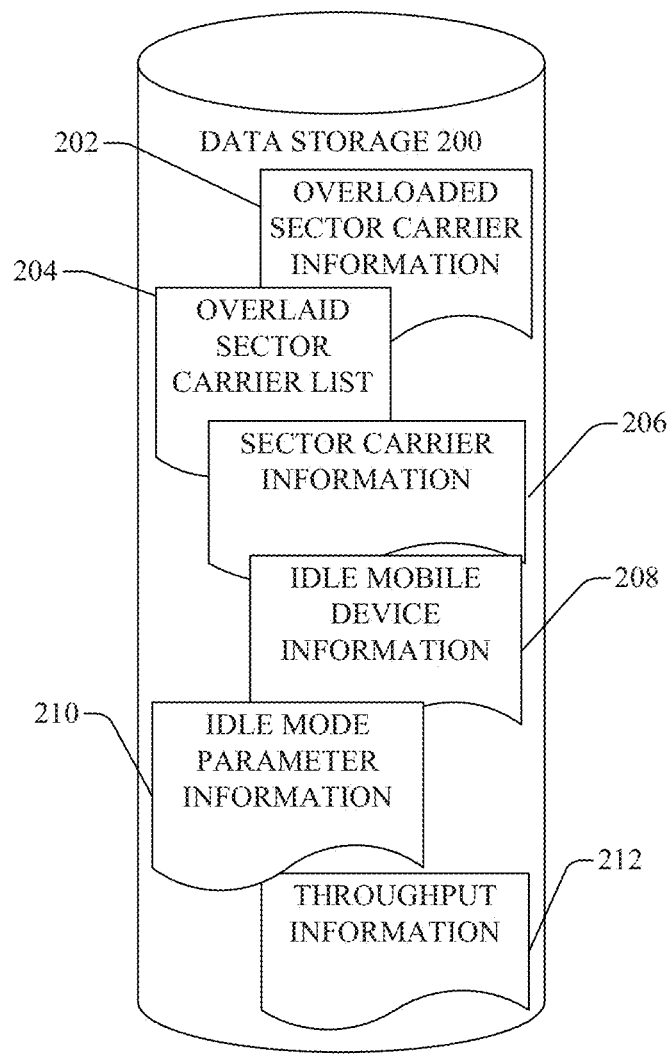
FIG. 2 illustrates an example data storage that facilitates processing for TL balancing in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

Wireless networks are rarely monolithic. The combined capacity of a wireless network can be subdivided between technologies, layers and/or sectors, which often overlap. These wireless layers rarely have the same coverage and capacity. The total efficiency (or lack of efficiency) and effective capacity of these non-monolithic networks can be dependent upon the ability to balance traffic for optimal utilization and performance of each layer.

This challenge can be compounded by the variety of applications and associated quality of service needs of typical devices (e.g., smart phones) and subscribers. For example, web browsing applications often require a large number of resources and high burst rate for a short amount of time. By contrast, voice over IP (VOIP) applications often require a small number of resources over an extended period of time.

Further, applications are often bursty, and data needs are rarely known about or predicted by the network before requested by the idle mobile device. Additionally, in many cases, there could be thousands of idle mobile devices camping on a sector carrier. However, until there is activity by the idle mobile devices, the BS typically has no way to know there is a risk of overloading the sector carrier. Because most bursty data traffic has a duration that is much shorter than that which load-based active mode handover mechanisms can typically support, there can be large amount of potential traffic associated with a sector carrier, and corresponding overload risk, without methods and systems to proactively balance this potential traffic. Further, balancing most bursty data after the traffic has begun is often very difficult and ineffective.

LTE-A carrier aggregation can facilitate concatenation and balance of downlink shared resources from multiple sector carriers on a per mobile device/per-transmission time interval (TTI) basis (e.g., 1 millisecond (ms)). Unfortunately carrier aggregation does not address uplink or control resource load management, and is not well-suited for many forms of small and bursty data traffic and devices typical for smart phone subscribers.

Range extension and reduction methods of shifting mobile devices between sector carriers are typically reactive and inaccurate as these methods tend to act in response to actual load conditions that are in progress.

Various embodiments described herein can proactively detect and correct potential traffic load imbalance between heterogeneous network layers (e.g., layered LTE networks) before the overload actually occurs, and while mobile devices are in the idle mode. As used herein, the term "traffic load" and "traffic loading" can mean an amount of traffic transmitted on an uplink or downlink in a sector carrier. In some embodiments, potential TL imbalance between network layers can be detected, and particular idle mode parameters can be identified and corrected to re-balance the potential TL imbalance. For example, the signal strength that causes the idle mobile device to bind to or leave different sector carriers can be changed. Accordingly, with the change in parameter, the idle mobile devices camping on a first sector carrier can be shifted to a second sector carrier. While correction can be applied for bursty applications and device behaviors typical of LTE smart phones. Embodiments described herein can also apply to other types of radio technology and devices.

In one or more embodiments, a method can include: detecting, by a system including a processor, a potential traffic load imbalance condition associated with a sector carrier of a plurality of sector carriers; and facilitating balancing, by the system, of traffic loading of the sector carrier based, at least, on adjusting an idle mode parameter associated with carrier selection by an idle mobile device of a plurality of idle mobile devices.

In one or more embodiments, a tangible computer-readable storage medium can store computer-executable instructions that, in response to execution, cause a system including a processor to perform operations. The operations can include: determining that a sector carrier of a plurality of sector carriers is an overloaded sector carrier; and facilitating balancing of potential traffic load for a plurality of idle mobile devices based, at least, on adjusting respective idle mode parameters for the plurality of idle mobile devices camping on the overloaded sector carrier.

In one or more embodiments, a system can include a memory that stores computer-executable instructions, and a processor, communicatively coupled to the memory, that facilitates execution of computer-executable instructions to: detect a potential traffic load overlay imbalance condition associated with a plurality of idle mobile devices; and balance a traffic loading by adjustment of signal strength information associated with at least one of a plurality of sector carriers to cause at least one idle mobile device of the plurality of idle mobile devices to shift between the plurality of sector carriers.

Accordingly, one or more of the embodiments can enhance TL balancing while mobile devices are in an idle mode thereby reducing the likelihood of a network traffic overload and improving the quality of service.

Turning first to FIG. 1, FIG. 1 illustrates an example system that facilitates processing for TL balancing in accordance with embodiments described herein. The TL balancing system 100 can include a communication component 102, a TL detection component 104, a TL balancing component 106, a TL checking component 108, a memory 110, a processor 112 and/or data storage 114. In some embodiments, one or more of the communication component 102, TL detection component 104, TL balancing component 106, TL checking component 108, memory 110, processor 112 and/or data storage 114 can be electrically and/or communicatively coupled to one another to perform one or more functions of the TL balancing system 100.

As used herein, the TL balancing system 100 (and components thereof) in any of the embodiments described herein can be independent of or be a part of or electrically or communicatively coupled to a BS, EMS or external SON platform. In some embodiments, the TL balancing system 100 (and components thereof) can transmit information to or receive information from the BS, EMS and/or SON platform.

The communication component 102 can transmit and/or receive information to and/or from one or more BSs and/or mobile devices. The communication component 102 can also transmit and/or receive information to and/or from systems that can store information indicative of a number of idle mobile devices associated with a sector carrier (e.g., an EMS system and/or an SON platform). In some embodiments, the communication component 102 can receive signal strength information from one or more mobile devices in idle mode and located in one or more different sector carriers.

The memory 110 can be a computer-readable storage medium storing computer-executable instructions and/or information for performing the functions described herein with reference to the TL balancing system 100. Processor 112 can perform one or more of the functions described herein with reference to the TL balancing system 100.

The data storage 114 can be configured to store information transmitted to, received by and/or processed by the TL balancing system 100. For example, with reference to FIGS. 2, 3, 4 and 5, the data storage 114, 200, 316 412, 514 can store overloaded sector carrier information 202, an overlaid sector carried list 204, sector carrier information 206, idle mobile device information 208, idle mode parameter information 210 and/or throughput information 212.

Figure 3:
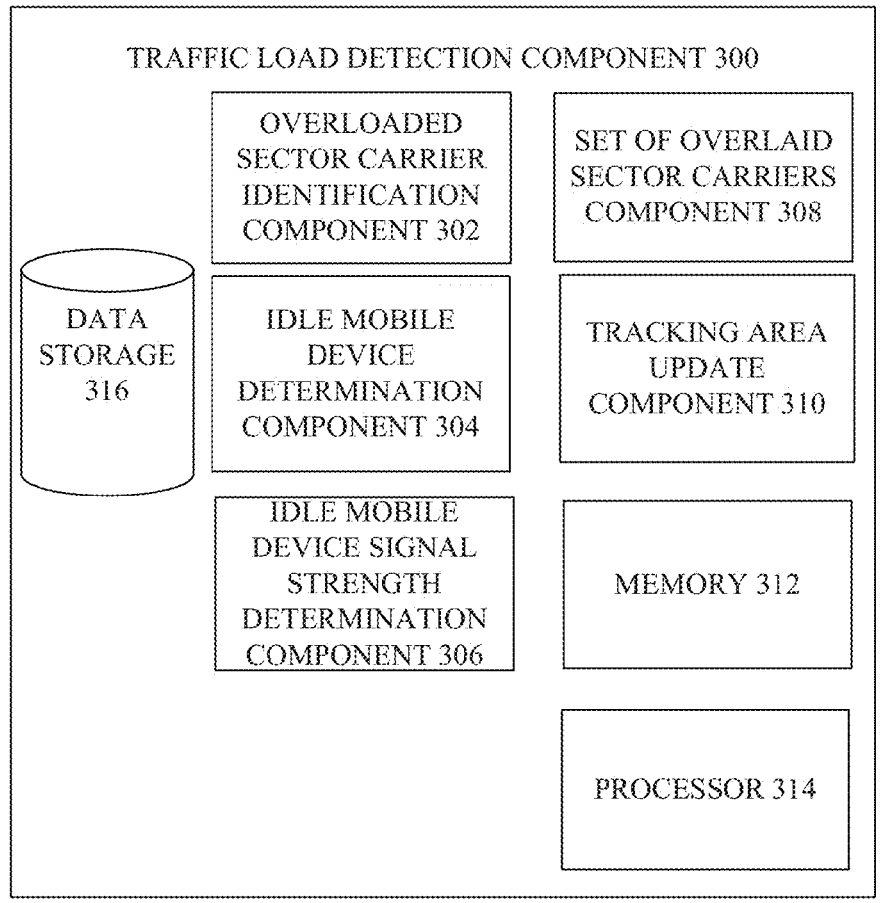
FIG. 3 illustrates an example system that facilitates processing for TL detection in accordance with embodiments described herein.

The TL detection component 104 can be described in greater detail with reference to FIG. 3. FIG. 3 illustrates an example system that facilitates processing for TL detection in accordance with embodiments described herein. One or more of the structure and/or functionality of TL detection component 104 can be as described with reference to TL detection component 300 (and vice versa).

The TL detection component 300 can include an overloaded sector carrier identification component 302, an idle mobile device determination component 304, an idle mobile device signal strength determination component 306, an set of overlaid sector carriers component 308, a tracking area update component 310, memory 312, processor 314 and/or the data storage 316. In some embodiments, one or more of the components, memory 312, processor 314 and/or data storage 316 can be electrically and/or communicatively coupled to one another to perform one or more of the functions of the TL detection component 300.

The TL detection component 300 can operate in an overlay detection mode to detect a potential traffic load overlay imbalance condition. Accordingly, the TL detection component 300 can detect a potential traffic load imbalance associated with one or more sector carriers (and which would affect the mobile devices camping on the sector carriers).

There are a number of different approaches for detecting load in a wireless system. This detection can be performed by the TL balancing system 100 utilizing information received from emergency management services (EMS) system in the network or from an external Self Optimizing Network (SON) platform, for example. In some embodiments, the TL balancing system 100 described herein can be included within an EMS system or an SON platform.

In some embodiments, overloaded sector carrier identification component 302 can identify an overloaded sector carrier. In some embodiments, an overloaded sector carrier can be a sector carrier having a predefined number of simultaneous scheduled mobile devices per TTI/Mhz that exceeds a particular threshold.

In some embodiments, an overloaded sector carrier can be identified by continually (or, in some embodiments, continuously) monitoring the average active mode throughput per user in the sector carrier. The average active mode throughput per user in the sector carrier can be compared with the average active mode throughput per user in the overlaid sector carriers. If the average active mode throughput per user in the sector carrier deviates (by a predefined percentage, e.g., 30%) from the average active mode throughput per user for the set of overlaid sector carriers, the sector carrier can be identified as an overloaded sector carrier.

In some embodiments, an overloaded sector carrier can be identified by continuously monitoring the sector carrier and comparing the number of active users per unit bandwidth for each sector carrier relative to the number of active users per unit bandwidth in the overlaid sector carriers. If the number of active users per unit bandwidth for a sector carrier deviates (by a predefined percentage, e.g., 30%) from the mean number of active users per unit bandwidth for the set of overlaid sector carriers, the sector carrier can be identified as an overloaded sector carrier.

In LTE systems, resource allocation per mobile device can flexibly allow a number of different approaches to resource allocation based on the load in the sector carrier. For example, a mobile device could be assigned all resources (e.g., time and/or physical resource block (PRB)) associated with a sector carrier, or some fraction of the resources associated with the sector carrier. LTE carriers can also be of varying sizes ranging from 1.4 to 20 megahertz (Mhz). As such, the number of simultaneous scheduled mobile devices per TTI/Mhz can have a direct influence on mobile device-experienced throughput and can be a good indicator of whether a sector carrier is overloaded.

The idle mobile device determination component 304 can make a determination as to the number of idle mobile devices for each sector carrier in a predefined area surrounding the overloaded sector carrier. The idle mobile device signal strength determination component 306 can determine the signal strengths of the idle mobile devices.

The set of overlaid sector carriers component 308 can determine the set of overlaid sector carriers. The sector carriers in the set of overlaid sector carriers can be those sector carriers that share a service area with the overloaded sector carrier. In some embodiments, the set of overlaid sector carriers includes the overloaded sector carrier. In various embodiments, overlaid sector carriers tend to share the same antenna location and/or bearing with the overloaded sector carrier, but use different frequencies. An EMS system or BS can identify the overlaid sector carriers in various embodiments.

Overlaid sector carriers, or cells can also be identified via geometry employing multi-site overlay detection. For example, a small cell within the same service area as a large cell, or large overloaded sector carrier, can be determined to be an overlaid sector carrier (and vice versa). In some embodiments, the service area can be a polygon. The multi-site overlay detection can be performed by the EMS or external SON platform (and communicated to the TL detection component 104) and/or performed by the TL detection component 104.

The set of overlaid sector carriers component 308 can identify one or more sector carriers of the set of overlaid sector carriers that are overloaded sector carriers. In some embodiments, if all overlaid sector carriers are already experiencing traffic overload then the detection and re-balancing process can stop because, in some embodiments, there is no benefit for load balancing between sector carriers that are all in overload already. Accordingly, in these embodiments, load balancing is not performed.

However, in embodiments wherein one or more overlaid sector carriers is not experiencing traffic overload, a TL balancing strategy can be employed. First, the set of overlaid sector carriers component 308 can compare the most and least loaded sector carriers in the set of overlaid sector carriers. If there are less loaded sector carriers within the set of overlaid sector carriers, the tracking area update component 310 can trigger a tracking area update for the sector carriers of the set of overlaid sector carriers.

The tracking area update component 310 can trigger a tracking area update thereby initiating mobile device transmitter activity. Upon initiating the transmitter activity, the number of mobile devices (and corresponding signal strengths of the mobile devices) on each overlaid sector carrier can be determined. In particular, the tracking area update component 310 can cause the broadcast tracking area to change to a temporary value. In some embodiments, the tracking area update component 310 can be located at the BS and changing the broadcast tracking area for each of the overlaid sector carriers to a temporary value can be performed at the BS only.

In some embodiments, the idle mobile device determination component 304 can determine the number of idle mobile devices associated with sector carriers that are part of the set of overlaid sector carriers. The idle mobile device signal strength determination component 306 can determine the signal strengths for those mobile devices of the set of overlaid sector carriers.

In these embodiments, the tracking area change can be considered to create a temporary virtual tracking area since the temporary tracking area change is at the BS only, and does not involve downstream network elements or databases like the mobility management entity (MME). The idle mobile devices can detect the change in broadcast tracking area and perform a tracking area update. In some embodiments, the tracking area update can result in brief mobile device transmitter activity that is detected by the receiver for the BS and for the overlaid sector carrier that serves the mobile device.

In these embodiments when the change is performed at the BS only, a daisy chain of network parameter adjustments in other network elements (e.g., MME) can be advantageously avoided. In various embodiments, the tracking area update can be intercepted by the BS in order to reduce the likelihood of downstream overload of component (e.g., MME) due to excessive tracking area updates. The tracking area update and tracking area change can be localized to and intercepted by the BS in various embodiments in order to reduce network signaling load.

Each overlaid sector carrier can count and report the number and signal strength of each received tracking area update to the TL detection component 104 or to a TL detection component 104 associated with an EMS or some external SON platform. Accordingly, the number and signal strengths of idle mobile devices associated with overlaid sector carriers can be determined by the idle mobile device determination component 304 and the idle mobile device signal strength determination component 306.

The TL detection component 104 can then calculate the overlay traffic load balance (or overlay traffic load imbalance) based on the number and signal strengths of the idle mobile devices. In some embodiments, the number of mobile devices is proportional to the bandwidth of the sector carrier for the mobile devices. This is ideal because each mobile device can be assumed to have equal probability for activity, and simultaneous mobile device activity can subdivide resources if the mobile devices are on the same sector carrier. If all other factors are equal, for example, a 10 Mhz LTE sector carrier can support the same throughput performance for approximately twice as many mobile devices as an overlaid 5 Mhz LTE sector carrier. However, some sector carriers may have better signal-to-interference noise ratio (SINR) than other sector carriers. Accordingly, the BS and/or TL detection component 104 can also build historical efficiency information for each sector carrier. For example, average throughput per Mhz for a sector carrier can be determined using actual throughput results compiled over time.

Using the LTE carrier size, actual number of idle mobile devices on the overlaid sector carrier and throughput per Mhz (or historical throughput per Mhz), the LTE detection component can calculate the potential throughput per mobile device. Potential throughput per mobile device can be computed as shown in Equation 1.

Potential Throughput Per Mobile Device=(Sector Carrier Size×Throughput Per Mhz)/Number of Idle Mobile Devices on Sector Carrier  (Equation 1)

Equation 1 assumes that all idle mobile devices are active during an overlapping time period (e.g., concurrently active).

A traffic load balance condition can exist when the potential throughput per mobile device is relatively uniform for all overlaid sector carriers. As used herein, conditions can be considered uniform and/or balanced when the predicted potential throughput per user, average active mode throughput per user and/or number of active users per unit bandwidth are all near the mean for the set of overlaid sector carriers. For example, in some embodiments, uniform and/or balanced conditions exist when all overlaid sector carriers have potential throughput per user, average active mode throughput per user and/or number of active users per unit bandwidth within 10% of the mean. In various embodiments, the percentage values to determine whether conditions are uniform and/or balanced can be dynamically adjusted from time to time. From time to time, percentage values can be adjusted to achieve an optimal mix of load balancing and stability (via the reduction of, or elimination of, the likelihood of oscillation).

A traffic load imbalance condition can exist when the overloaded sector carrier (based upon which the set of overlaid sector carriers was constructed) has more mobile devices (and lower potential throughput per mobile device) than the sector carriers of the set of overlaid sector carriers.

Figure 4:
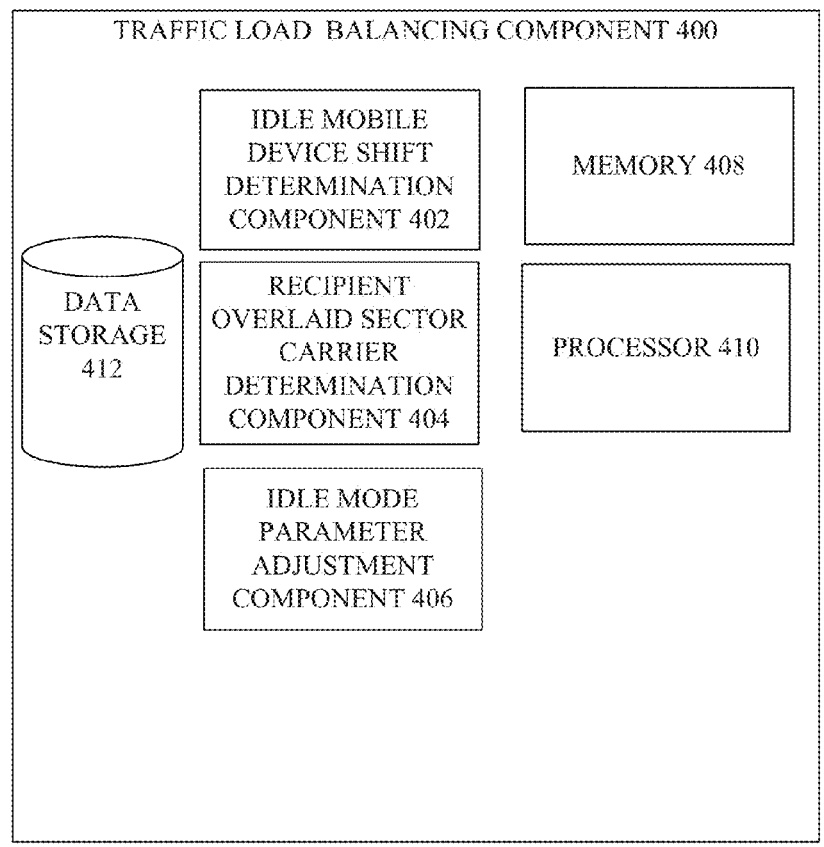
FIG. 4 illustrates an example system that facilitates processing for TL balancing in accordance with embodiments described herein.

In cases of traffic load overlay imbalance, the TL balancing component 106 can re-balance the traffic load. The TL balancing component 106 can be described in greater detail with reference to the TL balancing component 400 of FIG. 4. FIG. 4 illustrates an example system that facilitates processing for TL balancing in accordance with embodiments described herein. One or more of the structure and/or functionality of TL balancing component 106 can be as described with reference to TL balancing component 400 (and vice versa).

The TL balancing component 400 can include an idle mobile device shift determination component 402, a recipient overlaid sector carrier determination component 404, an idle mode parameter adjustment component 406, a memory 408, a processor 410 and/or a data storage 412. One or more of the idle mobile device shift determination component 402, recipient overlaid sector carrier determination component 404, idle mode parameter adjustment component 406, memory 408, processor 410 and/or data storage 412 can be electrically and/or communicatively coupled to one another to perform one or more functions of the TL balancing component 106, 400.

In some embodiments, the TL balancing component 400 can shift one or more idle mobile devices camping on a particular sector carrier to one or more different sector carriers by identifying particular idle mode parameters and updating the values of those parameters. In some embodiments, the idle mobile device shift determination component 402 can shift the mobile devices such that similar potential throughput per mobile device is provided for all sector carriers that are included in the set of overlaid sector carriers.

In some embodiments, the set of overlaid sector carriers includes the overloaded sector carrier. As such, the idle mobile device shift determination component 402 can shift the mobile devices such that similar potential throughput per mobile device is provided for all sector carriers that are included in the set of overlaid sector carriers (including the overloaded sector carrier).

Specifically, the idle mobile device shift determination component 402 can utilize the information indicative of the potential throughput per mobile device for all sector carriers of the set of overlaid sector carriers (including the overloaded sector carrier), and the signal strength for each of the idle mobile devices on each of the sector carriers of the set of overlaid sector carriers. The idle mobile device shift determination component 402 can utilize such information to identify the number of mobile devices to shift from the overloaded sector carrier.

The recipient overlaid sector carrier determination component 404 can determine the sector carriers of the set of overlaid sector carriers that can accept additional traffic associated with potential shifted mobile devices.

The idle mode parameter adjustment component 406 can determine a value to which to adjust the idle mode parameters (e.g., absolute or relative signal strengths associated with one or more sector carriers) to trigger the shift of one or more idle mobile devices from one sector carrier to another sector carrier.

Idle mobile devices can monitor system information broadcasts (SIB), which are broadcasts that include information identifying neighbor sector carriers and re-selection criterion for each serving sector carrier and neighbor sector carrier combination. The SIB can contain thresholds to trigger inter-carrier re-selection of a mobile device away from a sector carrier. For example, in some embodiments, the broadcast information can include absolute or relative signal strength information to dictate to the mobile devices selection (or re-selection) from one sector carrier to another sector carrier while the mobile devices are still in the idle mode.

For example, absolute signal strength can be a threshold communicated in the SIB to the mobile devices to tell the mobile devices to select a certain sector carrier if the absolute signal strength for the sector carrier is greater than a particular dBm value.

As another example, instead of the absolute signal strength method, a hysteresis value can be employed. Specifically, the SIB can be communicated to the mobile devices identifying a hysteresis value (e.g., relative signal strength value) between one sector carrier and another sector carrier. For example, if a neighboring sector carrier is stronger than the serving sector carrier by a certain amount of dBm, the mobile device can re-select to the neighboring sector carrier.

Timers can be employed with the adjustment of idle mode parameters in embodiments that utilize adjustment of absolute signal strength or adjustment of the relative signal strength. For example, the timers can tell the mobile devices that the condition for selection/re-selection based on either absolute signal strength or hysteresis must be true for a certain number of broadcasts of SIB information. Timers can thus be used to minimize oscillation of mobile devices between sector carriers thereby reducing the likelihood that selection/re-selection occurs with frequency that is too great.

Turning back to FIG. 4, because the signal strengths of the mobile devices in the area monitored are known, the system can estimate in advance, the number of mobile devices that will shift from one sector carrier to another sector carrier for a given change in threshold signal strength broadcast in the SIB.

The TL balancing component 400 can utilize all available throughput per mobile device and signal strength per mobile device information to determine various information. For example, the TL balancing component 106 can determine the number of mobile devices that should be shifted away from the overloaded sector carrier to achieve traffic load balance condition. As another example, the TL balancing component 106 can determine which sector carriers of the set of overlaid sector carriers have the greatest margin (e.g., greatest potential throughput per mobile device) to accept additional traffic that would be associated with mobile devices shifted to the sector carriers. As another example, the TL balancing component 400 can determine which type and amount of adjustment of idle mode parameters will achieve the desired traffic load balance condition.

The TL balancing component 400 can achieve traffic load balance in a number of different approaches. For example, if most other sector carriers of the set of overlaid sector carriers are uniformly loaded (e.g., have similar potential throughput per mobile device), the idle mode parameter adjustment component 406 (or, in some cases, the overloaded sector carrier as controlled by the TL balancing component 400) need not prefer one target sector carrier versus another for shift from the overloaded sector carrier. Rather, the mobile devices served by the overloaded sector carrier can be ranked by signal strength and inter-frequency re-selection thresholds can be raised above the signal strength of a lowest selected number of mobile devices. The selected number of mobile devices can be the number to shift from the overloaded sector carrier to achieve a traffic load balance condition.

In other embodiments, if most other sector carriers of the set of overlaid sector carriers are not uniformly loaded, the TL balancing component 400 can determine which sector carriers of the set of overlaid sector carriers are overloaded. The overloaded sector carrier can adjust re-selection criteria to prefer re-selection of mobile devices towards underloaded sector carriers of the set of overlaid sector carriers. Re-selection towards overloaded sector carrier can be likewise discouraged by adjusting the re-selection criteria.

In some embodiments, equivalent active mode handover parameters can be adjusted in tandem so the idle and active mode service areas remain matched. These automated idle mode parameter adjustments can be initiated by the idle mode parameter adjustment component 406. The revised re-selection parameters can be read by all idle mobile devices. Some of the idle mobile devices will then re-select away from the overloaded sector carrier. The same effect may be accomplished by adjusting other parameters (e.g., automated electrical antenna tilt adjustments). In this embodiment, the overloaded sector carrier may receive more electrical antenna tilt whereas the underloaded sector carrier may receive less. The resulting effect can be range extension or reduction, depending upon the desired traffic management effect.

Figure 5:
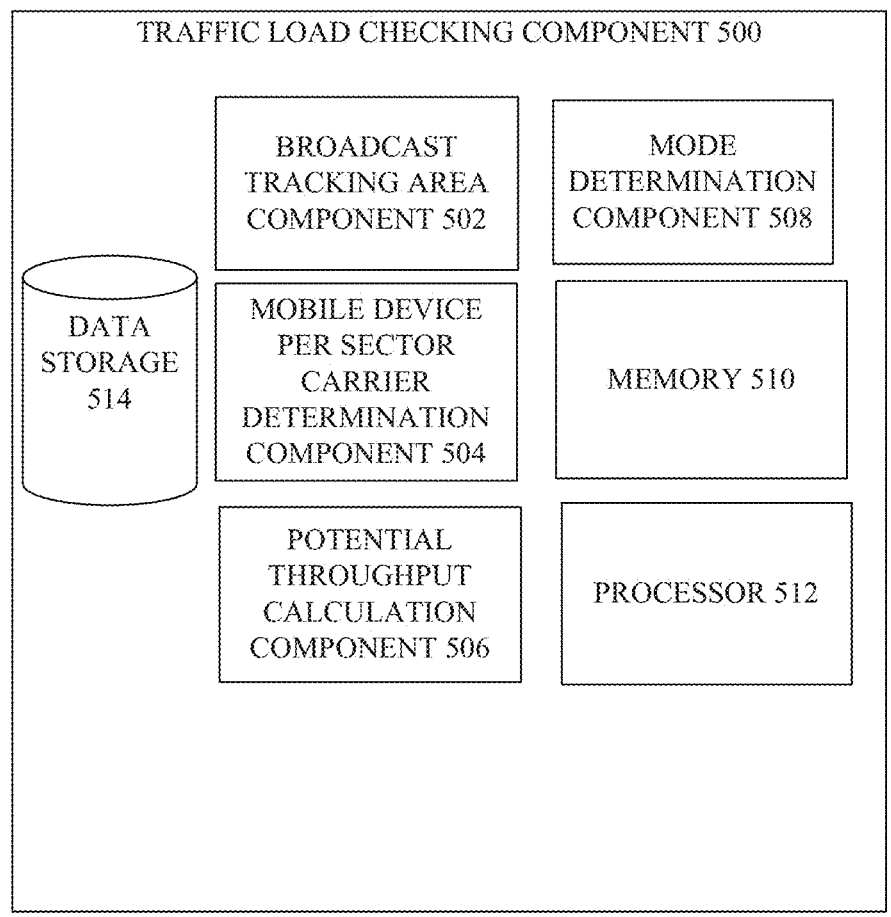
FIG. 5 illustrates an example system that facilitates processing for TL checking in accordance with embodiments described herein.

After the adjustment in idle mode parameter (and corresponding mobile device shift from the overloaded sector carrier), in some embodiments, the TL checking component 108 can check whether a traffic load overlay balance condition exists or whether a traffic load overlay imbalance condition exists. The TL checking component 108 can be described in greater detail with reference to the TL checking component 500 of FIG. 5. FIG. 5 illustrates an example system that facilitates processing for TL checking in accordance with embodiments described herein. One or more of the structure and/or functionality of TL checking component 108 can be as described with reference to TL checking component 500 (and vice versa).

After the balancing, the sector carriers of the set of overlaid sector carriers (including the overloaded sector carrier) are currently using the temporary tracking area set by the tracking area update component 310 of the TL detection component 300. The mobile devices have shifted between sector carriers as a result of the idle mode parameter adjustment by the idle mode parameter adjustment component 406 of the TL balancing component 400.

The TL checking component 108 can now re-check the new traffic load overlay condition resultant from the adjustment and shift of mobile devices. First, the broadcast tracking area component 502 can change the broadcast tracking area of the sector carriers of the set of overlaid sector carriers (including the overloaded sector carrier) back to the original broadcast tracking area value. Each mobile device then detects and performs the tracking area update. The mobile device per sector carrier determination component 504 can then re-check the number of mobile devices per sector carrier and the potential throughput calculation component 506 can re-calculate the potential throughput per mobile device, as described in Equation 1.

If potential throughput per mobile device is relatively uniform for all of the sector carriers of the set of overlaid sector carriers (including the overloaded sector carrier), the TL checking component 500 can return the TL balancing system 100 to overload detection mode (poised to begin the method again by operation of the TL detection component 104, when a potential traffic load imbalance condition occurs). If potential throughput per mobile device is not relatively uniform, or if an overloaded sector carrier is detected again, the TL checking component 500 can return the TL balancing system 100 to the TL detection component 104. The TL detection component 104, 300 can operate as described with reference to FIGS. 1 and 3, following by the TL balancing component 106, 400 and subsequent operation by the TL checking component 108, 500 re-balance the system again.

Figure 6A:
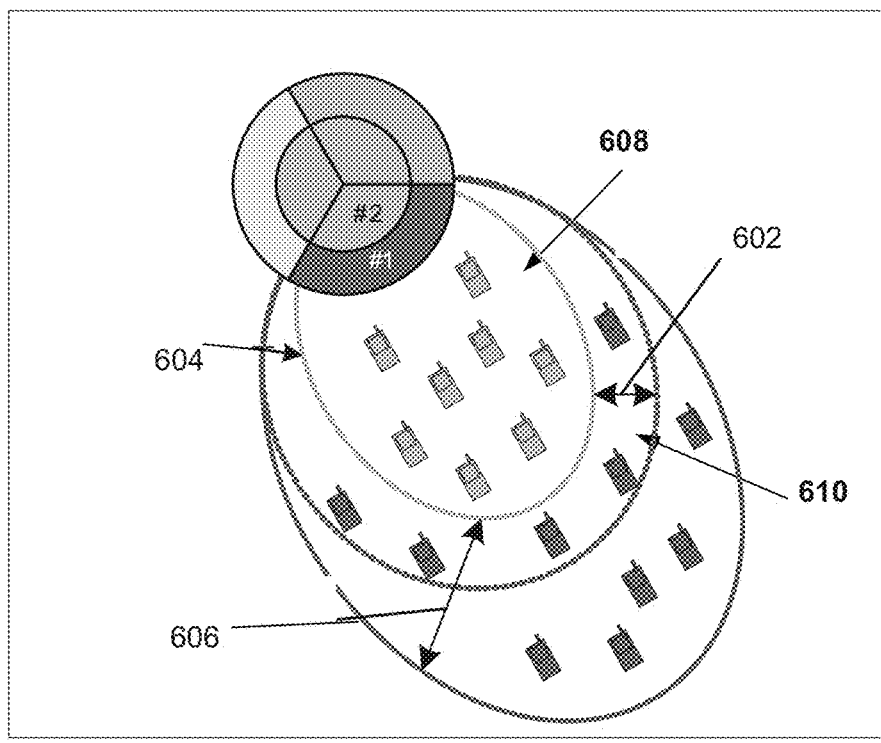
FIGS. 6A and 6B illustrate example assignments of mobile devices to sector carriers with respective traffic load imbalance and traffic load re-balanced conditions in accordance with embodiments described herein.
Figure 6B:
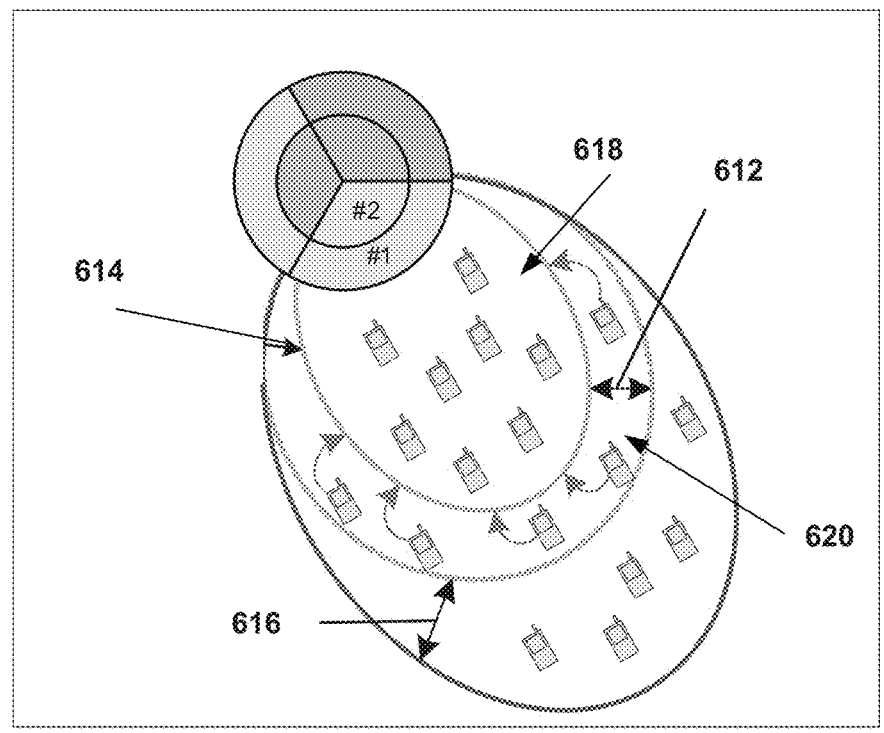
Figure 7:
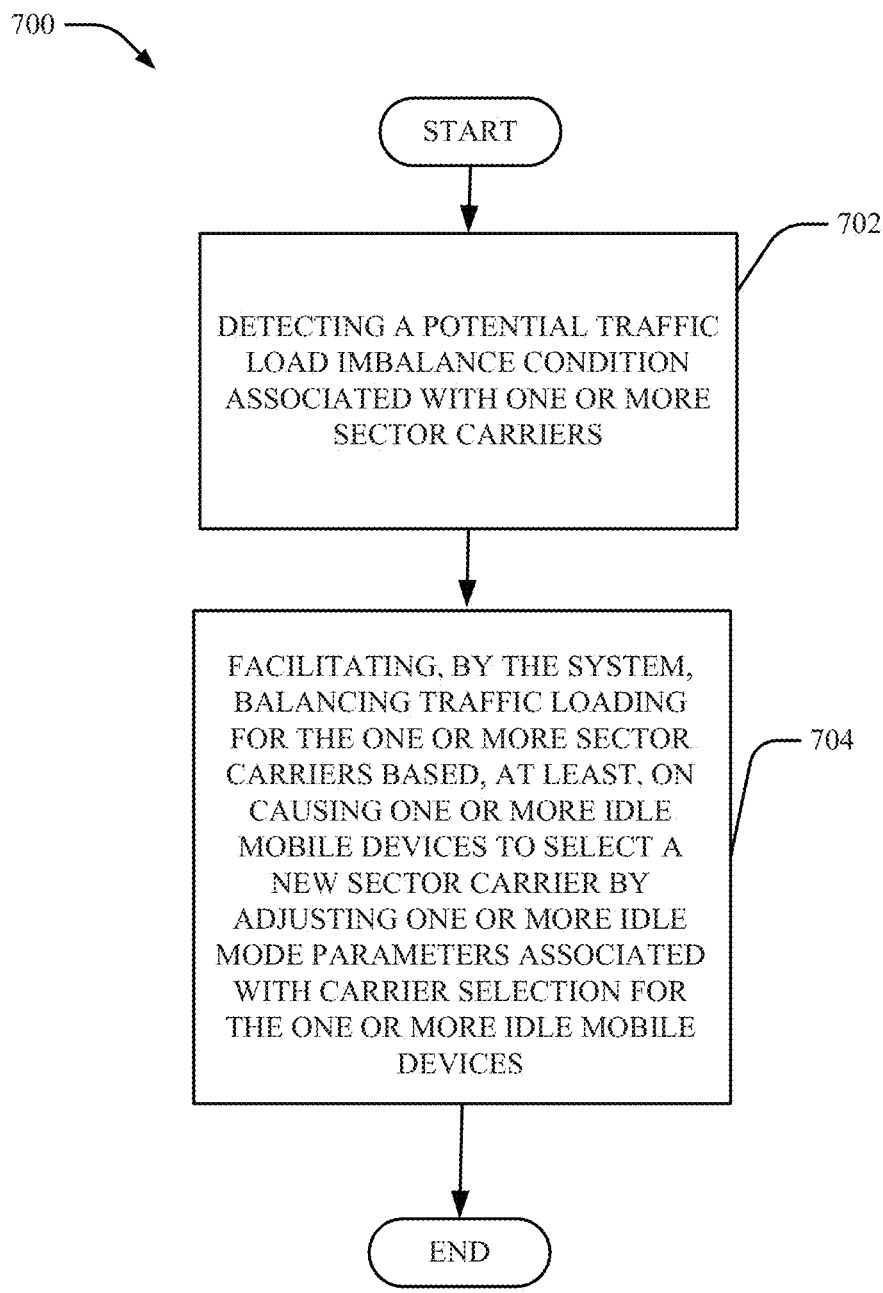
FIGS. 7-11 illustrate example flowcharts of methods that facilitate processing for TL balancing in accordance with embodiments described herein.

Turning to FIGS. 6A and 6B, shown are example assignments of mobile devices to sector carriers with respective traffic load imbalance and traffic load re-balanced conditions in accordance with embodiments described herein.

Turning first to FIG. 6A, the predicted throughput per mobile device is non-uniform across the sector carriers. For example, region 606 of sector carrier 1 has 10 mobile devices on five Mhz, resulting in an efficiency of 1 mega bits per second (Mbps)/Mhz and 0.5 Mbps/mobile device predicted throughput. There are five mobile devices 610 between −65 and −70 dBm as shown in the region 602 of sector carrier 1. Region 604 of sector carrier 2 has eight mobile devices 608 on 10 Mhz, efficiency of 2 Mbps/Mhz and 2.5 Mbps/mobile device predicted throughput. Accordingly, a potential traffic load imbalance condition exists in the state shown in FIG. 6A.

FIG. 6B shows the state of the network after re-balancing the traffic load of FIG. 6A. For region 612 of sector carrier 2, there is −5 dB range extension to cause five mobile devices 620 to shift to sector carrier 2 from sector carrier 1. Adjusting the idle mode parameters causes five mobile devices to shift to a sector carrier that can tolerate additional mobile devices by lowering the dBm threshold for sector carrier 2.

The predicted throughput in sector carrier 1 and 2 is now fairly uniform (1.5 Mbps/mobile device and 1.0 Mbps/mobile device as shown in FIG. 6B instead of 2.5 Mbps/mobile device and 0.5 Mbps/mobile device as shown in FIG. 6A). As such, FIG. 6B shows a traffic load balance condition. Specifically, after re-balancing, region 616 of sector carrier 1 has five mobile devices on 5 Mhz (instead of 10 mobile devices on 5 Mhz, as shown in FIG. 6A for region 606). The resultant efficiency is 1 Mbps/Mhz and 1.0 Mbps/mobile device predicted throughput. For region 614 of sector carrier 2, there are 13 mobile devices 618 on 10 Mhz, efficiency of 2 Mbps/Mhz and 1.5 Mbps/mobile device predicted throughput.

FIGS. 7-11 illustrate example flowcharts of methods that facilitate processing for TL balancing in accordance with embodiments described herein. At 702, method 700 can include detecting a potential traffic load imbalance condition associated with one or more sector carriers. At 704, method 700 can include facilitating balancing traffic loading for the sector carriers. Facilitating balancing can be based, at least, on causing one or more idle mobile devices to select a new sector carrier by adjusting one or more idle mode parameters associated with carrier selection for the one or more idle mobile devices.

Figure 8:
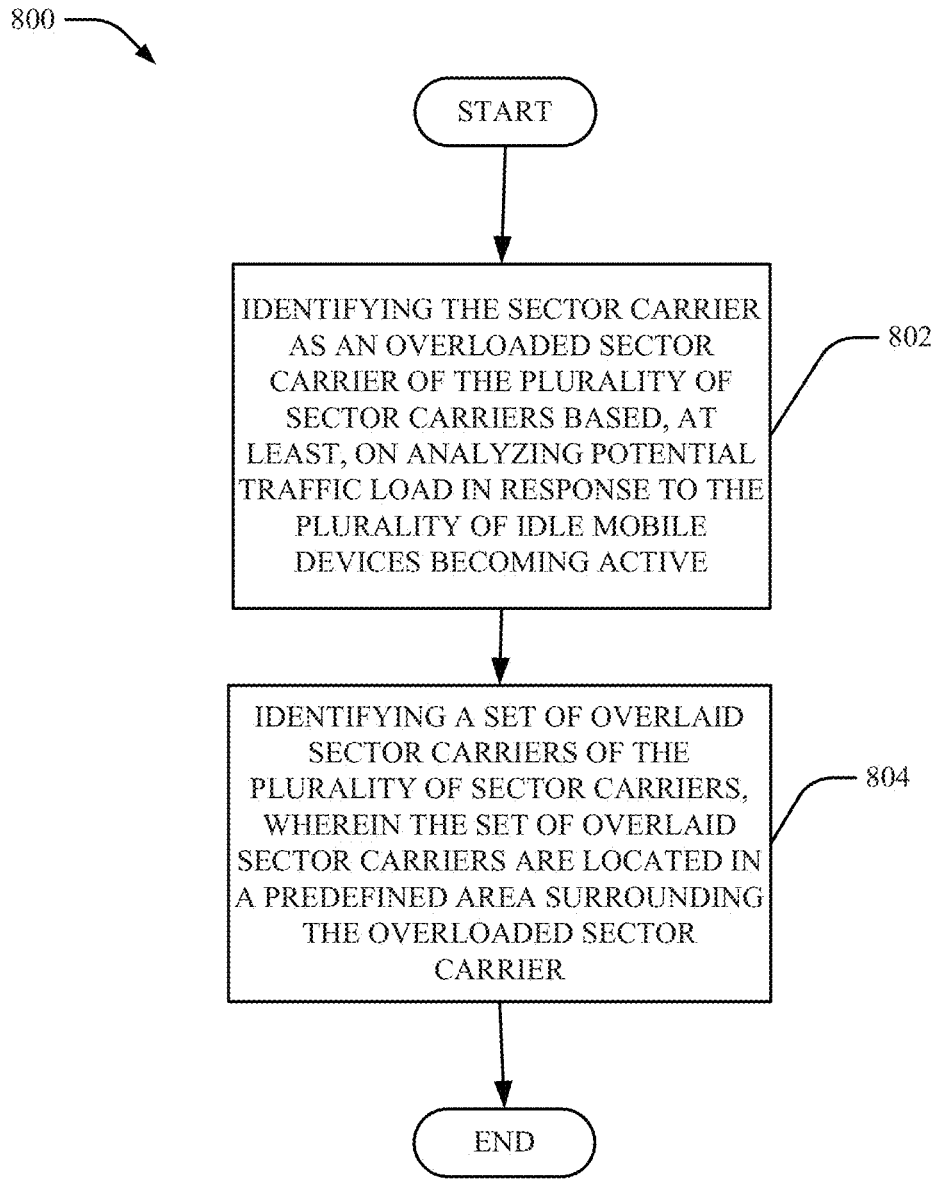

The method of detecting potential traffic load imbalance condition can be performed as described and shown in FIG. 8. At 802, method 800 can include identifying the sector carrier as an overloaded sector carrier of the plurality of sector carriers. The identification can be based, at least, on analyzing potential traffic load in response to the idle mobile devices becoming active.

At 804, method 800 can include identifying a set of overlaid sector carriers of the plurality of sector carriers. The set of overlaid sector carriers can be located in a predefined area surrounding the overloaded sector carrier.

Figure 9:
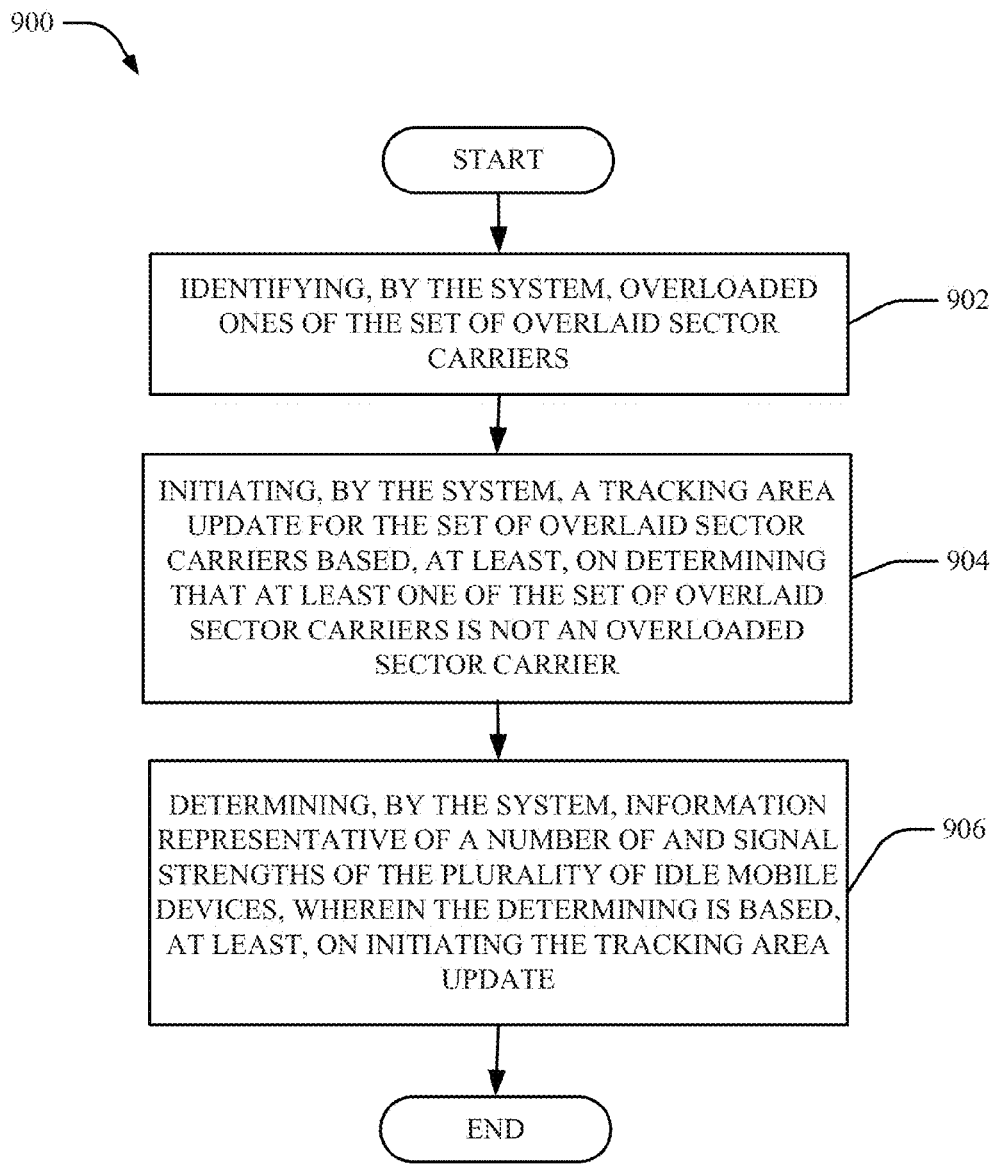

A method of determining the number of idle mobile devices and corresponding signal strengths of mobile devices camping on sector carriers of the set of overlaid sector carriers can be as described in FIG. 9. At 902, method 900 can include identifying overloaded sector carriers of the set of overlaid sector carriers. The set of overlaid sector carriers can include the sector carriers that share the same service area as the overloaded sector carrier.

At 904, method 900 can include initiating a tracking area update for the set of overlaid sector carriers based, at least, on determining that at least one of the sector carriers of the set of overlaid sector carriers is not an overloaded sector carrier. In various embodiments, in lieu of step 904, the method can include determining whether all of the sector carriers of the set of overlaid sector carriers are overloaded sector carriers. If all of the sector carriers are overloaded, the method can stop at 904.

If all of the sector carriers are not overloaded, at 906, method 900 can include determining information representative of a number of and signal strengths of the idle mobile devices. The determination can be made upon initiating the tracking area update.

In various embodiments, a determination of a traffic load overlay imbalance condition or balance condition can be determined based, at least, on the potential throughput per mobile device camping on the overlaid sector carrier. A determination that the traffic load overlay imbalance condition exists can be made upon determining that the overloaded sector carrier has more mobile devices and lower potential throughput per mobile device than other sector carriers of the set of overlaid sector carriers. A determination that the traffic load overlay balance condition exists upon determining that the potential throughput per mobile device is uniform for all sector carriers of the set of overlaid sector carriers and for the overloaded sector carrier.

Figure 10:
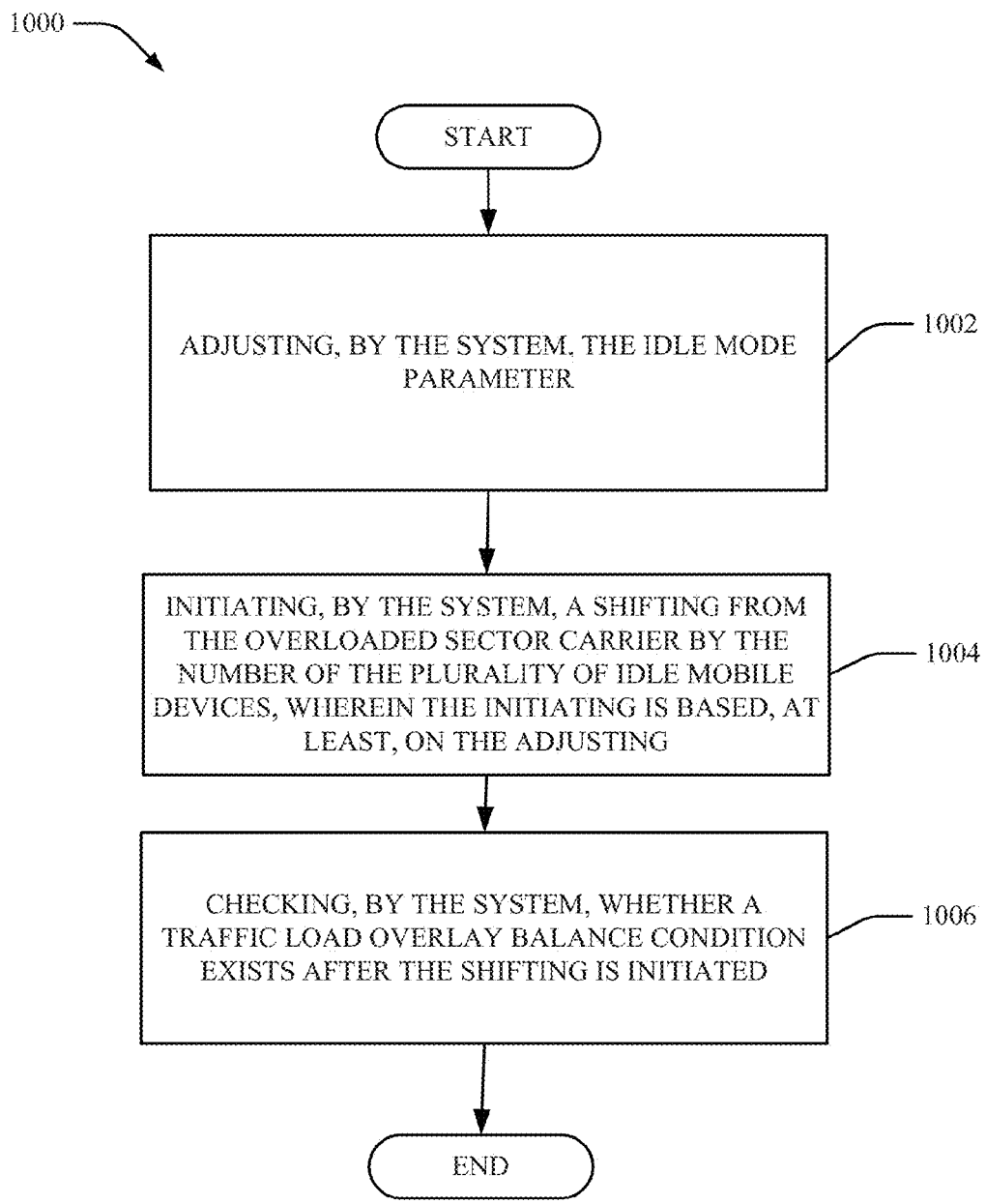

The method of balancing and checking traffic loading is as described in FIG. 10. At 1002, method 1000 can include adjusting at least one idle mode parameter. The idle mode parameter can be associated with carrier selection for the mobile devices. The adjustment can be based on selecting a number of the mobile devices to shift from the overloaded sector carrier, the sector carriers of the set of overlaid sector carriers that can accept shifted mobile devices and/or an amount to adjust the idle mode parameters to trigger the selected number of mobile devices to shift from the overloaded sector carrier.

At 1004, method 1000 can include initiating shifting, by the idle mobile devices, from the overloaded sector carrier. The shifting can be in response to the adjustment of the idle mode parameter.

In various embodiments, neighbor sector carriers and re-selection criterion for each serving sector carrier and neighbor sector carrier can be adjusted. Thresholds to trigger inter-carrier re-selection of a mobile device away from a sector carrier can be adjusted in some embodiments.

At 1006, method 1000 can include checking whether a traffic load overlay balance condition exists after the shifting of the one or more mobile devices is initiated.

Figure 11:
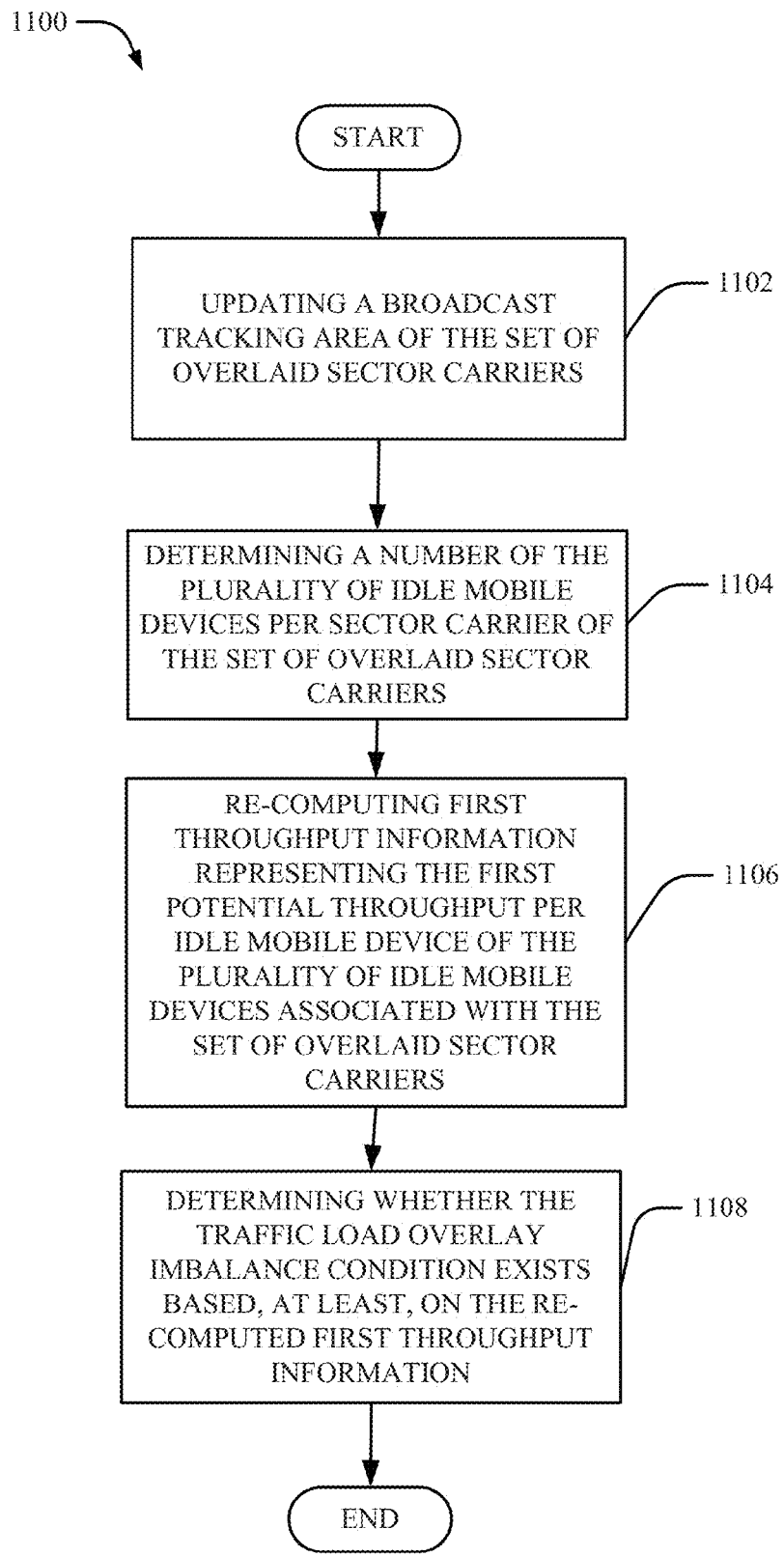

The checking of step 1006 can be as described in FIG. 11. At 1102, method 1100 can include updating the broadcast tracking area of the set of overlaid sector carriers. The broadcast tracking area can be updated back to the original broadcast tracking area (prior to initiating the tracking area update) in some embodiments. At 1104, method 1100 can include determining the number of idle mobile devices per sector carrier for the idle mobile devices associated with the set of overlaid sector carriers.

At 1106, method 1100 can include re-computing the potential throughput per idle mobile device (of the idle mobile devices associated with the set of overlaid sector carriers). The re-computation of the potential throughput can be performed as described with reference to Equation 1.

At 1108, method 1100 can include determining whether the traffic load overlay imbalance condition exists based, at least, on the potential throughput per mobile device. If traffic load overlay balance condition exists, the method can stop. If an imbalance condition exists, the method can continue by performing the steps of FIGS. 7, 8, 9, 10 and 11 again.

In some embodiments, although not shown, the method of detecting and balancing traffic load conditions can be as follows.

Performing overload detection by determining whether there is a low predicted throughput per mobile device.

Performing traffic load overlay imbalance condition detection. The detection can be performed by building an set of overlaid sector carriers, checking whether any sector carriers of the set of overlaid sector carriers are not overloaded, initiating a tracking area update with measurements of the number of idle mobile devices and signal strengths of the idle mobile devices (if there is at least one sector carrier of the set of overlaid sector carriers that is not overloaded) and calculating the traffic load imbalance (mobile device per spectrum).

Next, the balancing can include calculating optimal balancing parameter values and changing the parameters to the calculated optimal values.

Next, in some embodiments, the system can check the condition of the network after the balancing to determine if the method must be performed again starting from performing overload detection. Specifically, the checking can include restoring original tracking area measurements, re-calculating the traffic load imbalance (mobile device per spectrum) and determining whether the imbalance still exists based on the value of the mobile device per spectrum. If the imbalance still exists, the method is repeated starting at performing overload detection.

The process can be repeated over time (during the same day), based on the location (highway, indoor environment). For example, during the course of days, weeks, months, the load on all of the sector carriers can be recorded and the historical traffic loading on different sectors can be known and balancing proactively done based on the historical traffic loading. Accordingly, based on the historical traffic loading, balancing can be performed. In the other embodiments described, the actual traffic loading can be determined as described above.

Figure 12:
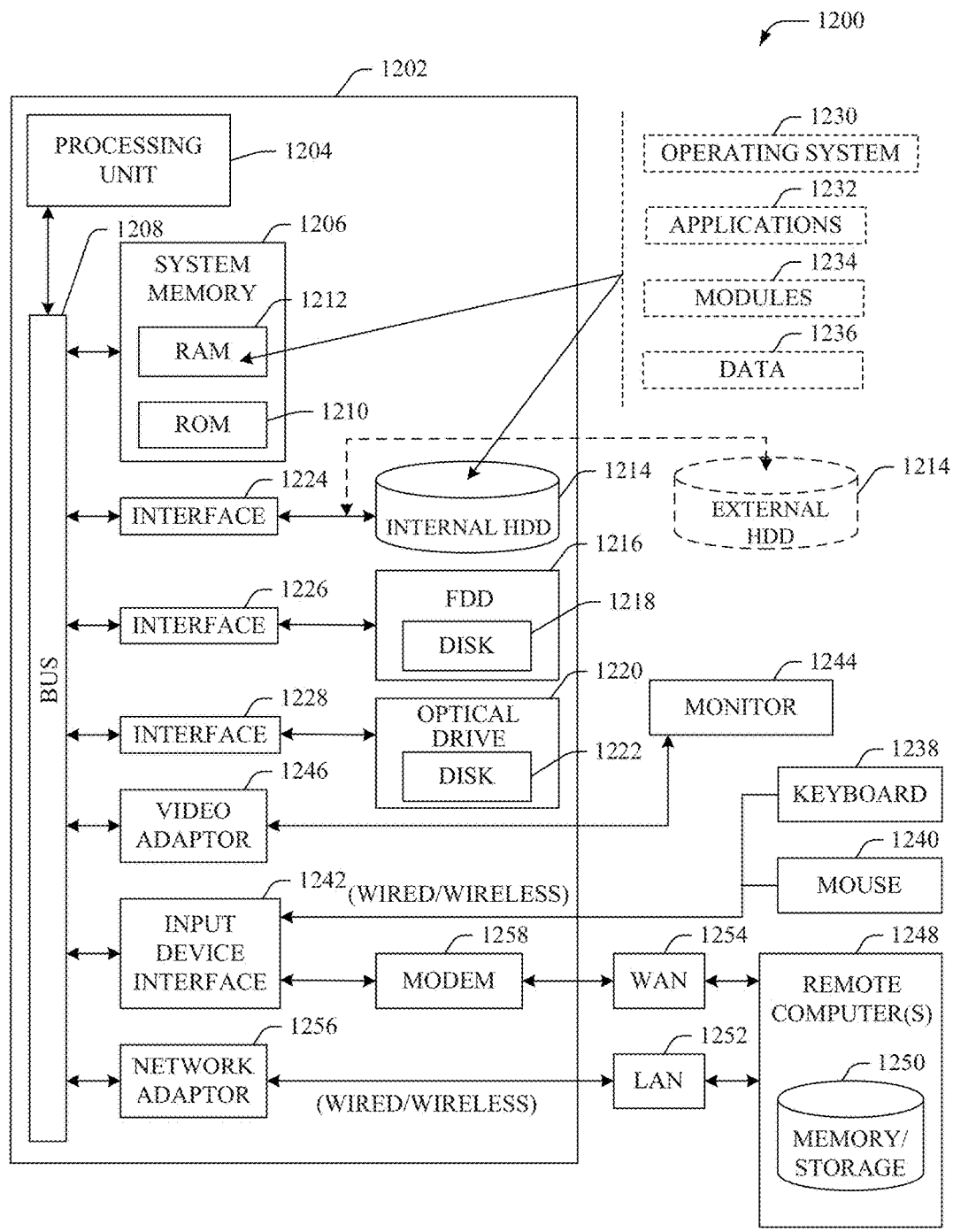
FIG. 12 illustrates a block diagram of a computer operable to facilitate processing for TL balancing.

Referring now to FIG. 12, there is illustrated a block diagram of a computer operable to facilitate TL balancing. For example, in some embodiments, the computer can be or be included within the TL balancing system 100.

In order to provide additional context for various embodiments of the embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A mobile device can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless AP disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   identifying, by a system comprising a processor, an overlaid sector carrier of overlaid sector carriers, wherein the overlaid sector carrier is located in a defined area surrounding a boundary of an overloaded sector carrier of the sector carriers;
   determining, by the system, that a traffic load overlay imbalance condition exists based on determining that a first potential throughput per idle mobile device of first idle mobile devices associated with the overloaded sector carrier represented in first throughput information is lower than a second potential throughput per idle mobile device of second idle mobile devices associated with the overlaid sector carrier represented in second throughput information; and
   initiating, by the system, a tracking area update for the overlaid sector carriers based on determining that one of the overlaid sector carriers is not overloaded according to a first criterion defining when overload is present.

2. The method of claim 1, further comprising:
   detecting, by the system, a potential traffic load imbalance condition associated with a sector carrier of the sector carriers.

3. The method of claim 2, wherein the detecting comprises:
   identifying the sector carrier as the overloaded sector carrier of the sector carriers based on analyzing a traffic load resulting from the first idle mobile devices having become active.

4. The method of claim 1, wherein the defined area comprises a service area overlapping with the overloaded sector carrier.

5. The method of claim 1, further comprising:
   identifying, by the system, overloaded ones of the overlaid sector carriers.

6. The method of claim 5, further comprising:
   determining, by the system, information representative of a number of, and signal strengths of, the second idle mobile devices, wherein the determining is based on the initiating the tracking area update.

7. The method of claim 1, wherein the determining that the one of the overlaid sector carriers is not overloaded according to the first criterion further comprises:
   determining that the one of the overlaid sector carriers is not overloaded based on the second throughput information.

8. The method of claim 1, further comprising:
   determining, by the system, that a traffic load balance condition exists based on determining that the second potential throughput per idle mobile device of the second idle mobile devices satisfies a criterion.

9. The method of claim 1, wherein the overloaded sector carrier is a first sector carrier, and further comprising:
   facilitating, by the system, balancing of traffic loading of the sector carriers based on adjusting an idle mode parameter associated with carrier selection by an idle mobile device of the second idle mobile devices, wherein the facilitating the balancing comprises:
     determining a defined number of the first idle mobile devices to shift from the overloaded sector carrier; and
     determining an amount to adjust the idle mode parameter to cause the defined number of the first idle mobile devices to shift from the overloaded sector carrier to a second sector carrier of the overlaid sector carriers.

10. The method of claim 9, further comprising:
    adjusting, by the system, the idle mode parameter; and based on the adjusting, initiating, by the system, a shifting from the overloaded sector carrier by the defined number of the first idle mobile devices.

11. The method of claim 10, further comprising:
checking, by the system, whether a traffic load overlay balance condition exists after the shifting has been determined to have been initiated.

12. The method of claim 11, wherein the checking comprises:
updating a broadcast tracking area of the overlaid sector carriers;
determining a number of third idle mobile devices per sector carrier of the overlaid sector carriers;
updating the first throughput information representing the second potential throughput per idle mobile device of the second idle mobile devices resulting in updated second throughput information; and
determining whether the traffic load overlay imbalance condition exists based on the updated second throughput information.

13. A non-transitory computer-readable storage medium, comprising executable instructions that, when executed by a processor, facilitate performance of operations, comprising:
detecting a potential traffic load imbalance condition associated with a sector carrier of sector carriers;
determining that the sector carrier of the sector carriers is an overloaded sector carrier based on determining that a first potential throughput per idle mobile device of first idle mobile devices associated with the overloaded sector carrier represented in first throughput information is lower than a second potential throughput per idle mobile device of second idle mobile devices associated with overlaid sector carriers of the sector carriers represented in second throughput information; and
balancing a traffic loading comprising adjusting signal strength information associated with one of the sector carriers to cause an idle mobile device of the first idle mobile devices to shift between the sector carriers.

14. The non-transitory computer-readable storage medium of claim 13, wherein the operations further comprise:
facilitating balancing of potential traffic load for the first idle mobile devices based on adjusting respective idle mode parameters for the first idle mobile devices camping on the overloaded sector carrier, and wherein the facilitating the balancing is performed at time intervals based on historical information indicative of a traffic load overlay imbalance condition for one of the sector carriers.

15. The non-transitory computer-readable storage medium of claim 14, wherein the adjusting the respective idle mode parameters comprises adjusting a re-selection criterion for serving sector carriers of the sector carriers and neighbor sector carriers within a defined distance to the sector carriers, and wherein the serving sector carriers and the neighbor sector carriers comprise the overlaid sector carriers associated with the overloaded sector carrier.

16. The non-transitory computer-readable storage medium of claim 15, wherein the re-selection criterion comprises a criterion based on a condition to trigger inter-carrier re-selection of an idle mobile device of the first idle mobile devices.

17. The non-transitory computer-readable storage medium of claim 14, wherein the facilitating the balancing comprises employing hysteresis information to steer an idle mobile device of the first idle mobile devices towards a first sector carrier, and wherein the first sector carrier is an overlaid sector carrier of the overlaid sector carriers associated with the overloaded sector carrier.

18. A system, comprising:
a processor; and
a memory that stores executable instructions that, when executed by the processor, facilitate performance of operations, comprising:
detecting a potential traffic load overlay imbalance condition associated with first idle mobile devices;
determining that a traffic load overlay imbalance condition exists for the first idle mobile devices based on determining that a first potential throughput per idle mobile device of the first idle mobile devices associated with an overloaded sector carrier represented in first throughput information is lower than a second potential throughput per idle mobile device of second idle mobile devices associated with an overlaid sector carrier of sector carriers represented in second throughput information, wherein the overlaid sector carrier is located in a defined area surrounding a region associated with the overloaded sector carrier; and
balancing a traffic loading by adjusting signal strength information associated with one of the sector carriers to cause an idle mobile device of the first idle mobile devices to shift between the sector carriers.

19. The system of claim 18, wherein the balancing is performed at time intervals based on historical information indicative of a traffic load overlay imbalance condition for a sector carrier of the sector carriers.

20. The system of claim 19, wherein the signal strength information comprises absolute signal strength information for the sector carrier.

* * * * *